United States Patent [19]
Hoy et al.

[11] Patent Number: 5,828,728
[45] Date of Patent: Oct. 27, 1998

[54] TELECOMMUNICATIONS NETWORK

[75] Inventors: Michael D. Hoy, Ipswich; Stephen J. Curtis, Felixstowe, both of England

[73] Assignee: British Telecommunications public limited company, London, England

[21] Appl. No.: 672,350

[22] Filed: Jun. 25, 1996

[30] Foreign Application Priority Data

Feb. 5, 1996 [GB] United Kingdom .................... 9602247

[51] Int. Cl.⁶ .............................. H04M 3/46; H04M 1/24
[52] U.S. Cl. ................................. 379/29; 379/26; 379/21; 379/5
[58] Field of Search .................................. 379/5, 6, 7, 8, 379/22, 24, 26, 27, 29, 32, 30

[56] References Cited

U.S. PATENT DOCUMENTS 4,764,949  8/1988  Faith et al. .
4,862,491  8/1989  La Salle et al. ............................ 379/6

FOREIGN PATENT DOCUMENTS 2520925    5/1975   Germany .
WO 95/07588  3/1995  WIPO .

*Primary Examiner*—Paul Loomis
*Attorney, Agent, or Firm*—Nixon & Vanderhye P.C.

[57] ABSTRACT

Testing of pre-ringing signalling in a telecommunications network at customer's premises, for example, signalling to activate a caller display unit may be effected remotely. By establishing a test call through the network by way of a dial-back loop to a test telephone number, establishing a second call through the network to the required telephone and simulating pre-termination conditions at network termination, actual signalling tones at the network edge are monitored by corresponding apparatus to that present at customer premises.

6 Claims, 1 Drawing Sheet

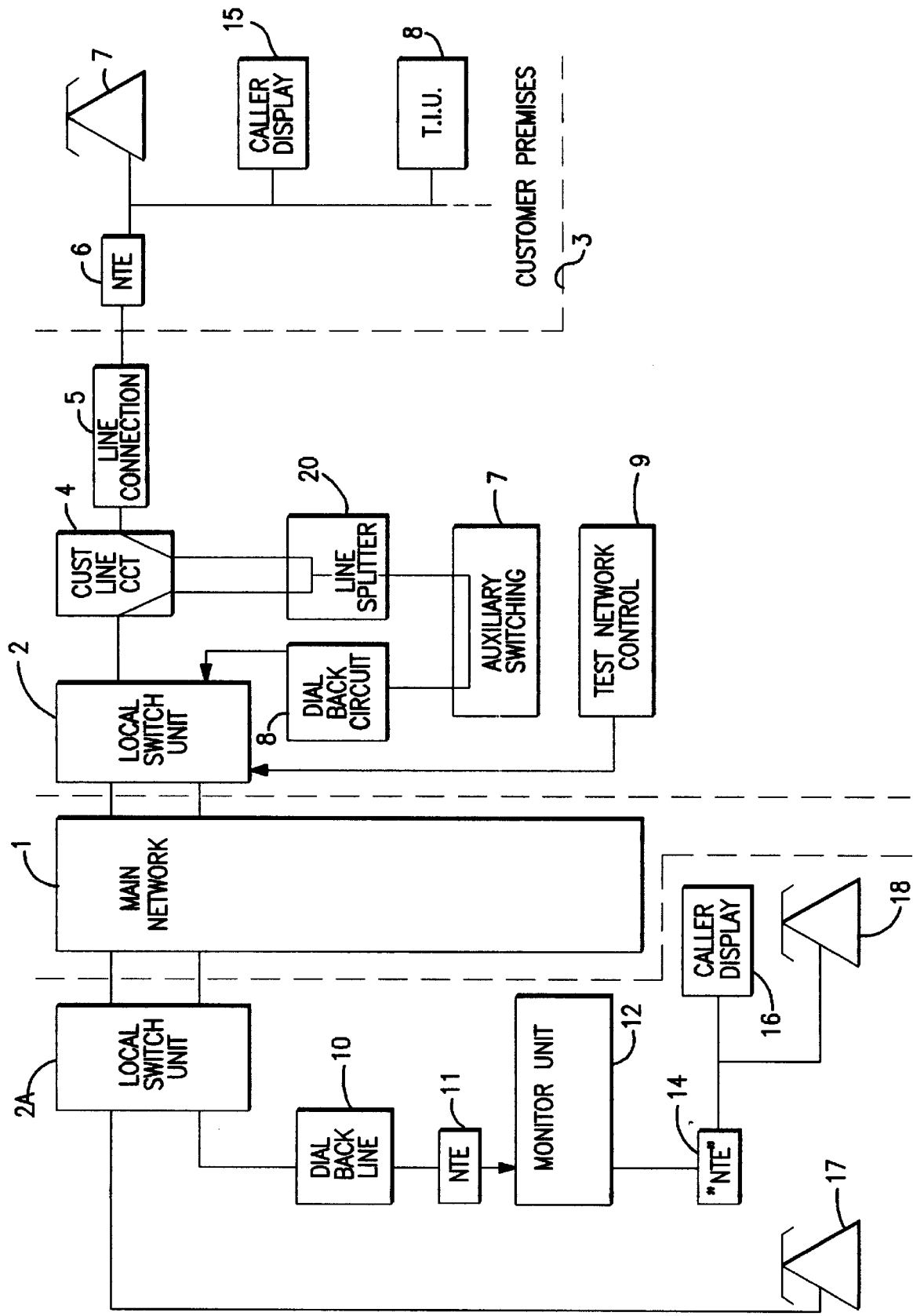

TELECOMMUNICATIONS NETWORK

BACKGROUND OF THE INVENTION

1. Field of the Invention

The present invention relates to telecommunications networks and more particularly to methods of monitoring signals supplied to customer premises equipment attached to such telecommunications networks.

2. Related Art

As facilities provided by way of switched telephone networks become more complex, isolating faults in response to customer complaints can become time consuming. In many cases services provided from a remote location may pass through a number of switching centres and concentrators before reaching the customer connection at the network edge.

Customer premises equipment has also become more complex including units responsive to signals other than traditional ringing current and/or to signals additional to such ringing current. For example, in our co-pending European patent application number 94302756.5 a number of alerting signal types for non-ringing telephony applications are disclosed.

Such applications include, for example, telemetry, messaging and data transfer for switching domestic appliances on or off (also known as telecontrol). Many equipment manufacturers are designing equipments for use with such applications and in some cases a manufacturer rather than the public switch telephone network (PSTN) operator determines the signalling requirements.

In consequence of the complex signalling patterns which may arise and the difficulty of knowing to within an acceptable window when such signals will arrive at a line termination point at customer's premises the cost of sending suitably qualified maintenance personnel to customer's premises may be unacceptably high. However, this has often been the only way in which a network fault could be eliminated or signalling accuracy could be established.

SUMMARY OF THE INVENTION

The present invention seeks to provide apparatus and methods in a telecommunications network to simplify the monitoring of signals (whether typical or specific) and remote locations.

According to one aspect of the present invention there is provided testing apparatus for connection to a monitoring point in a telecommunications network of the kind including means to establish a test connection through the network from network termination points to remote monitoring positions, the apparatus comprising: means to cause the establishment of first and second calls through the network to network termination points by way of separate transmission paths, means to hold the transmission path established by a first call and to connect the transmission path through a connection port to signal monitoring apparatus during the second call characterised in that the monitoring apparatus further includes means to simulate normal on hook and pre-signalling conditions to the connection port whereby signals transmitted to the network termination point on establishment of the second call are received by connected monitoring apparatus.

According to another aspect of the invention there is provided a method of testing signalling in a telecommunications network comprising the steps of establishing a first call through a network to a remote point, causing a path to be established from the remote point to a monitoring location, releasing the first call, establishing a second call to the remote point and simulating network conditions at the monitoring location to cause apparatus connected at that location to respond to network signals forwarded to the remote point.

BRIEF DESCRIPTION OF THE DRAWING

A telecommunications network including testing apparatus in accordance with the invention using the method of the invention will now be described by way of example only with reference to the accompanying drawing which is a block schematic diagram of a telecommunications network using the invention.

DETAILED DESCRIPTION OF EXEMPLARY EMBODIMENTS

Referring to the drawing, a typical switched telecommunications network is represented by main network 1 and comprises digital main switching units interconnected by optical fibre or other trunking arrangements. Local switch units (e.g. switch unit 2) are connected to customer premises 3 by way of customer line circuits 4 and local access network connections 5.

In the customer premises 3, the local access network connection terminates in a socket or other network termination (NTE) 6 to which the customer may connect suitable approved telecommunications apparatus such as a telephone 7. Other apparatus such as telemetry interface units 8 provided by the customer, network operator or other service provider, may be connected to the NTE 6.

Connected in the network by way of a local switch unit 2A testing stations or customer service centres (only part of one is shown) are provided. These centres are provided with various equipments to enable testing of the customer loop and other facilities without needing engineering support at the customer premises 3.

To permit such access switching, controllable across the network 1, parallel signal monitoring is provided. Thus, within the customer line circuit 4 it is possible to split the line 5 and to set up a parallel connection through the network to a remote monitoring position.

Thus in the local exchange auxiliary switching 7 may be used to connect any link from a customer line circuit 4 to a dial back circuit 8, for example, which may be programmed to set up a call via the local switch unit 2 through the main network 1 to a predetermined or pre-selected telephone number represented as a dial back line 10. It will be noted that the called telephone number may effectively be anywhere in the world and could be selected at the time of establishing the test link. Thus, the expression predetermined or pre-selected does not necessarily mean permanently pre-set.

The dial back line 10 is connected in the same way as a normal telephony line to a network termination 11. In the present invention a special monitoring unit 12 is connected to the NTE 11 to allow supervision of the remote customer line circuit 4.

The monitoring unit 12 includes a connection 14 of the same kind as NTE 6 to which any available customer premises equipment may be connected. To facilitate understanding of the purpose of the invention and its implementation, some understanding of signalling protocols used to provide non-ringing or pre-ringing information to NTEs (e.g. 6) is required.

Some examples of no-ring call signalling may be found in our co-pending PCT patent application number GB95/00853 filed 12 Apr. 1995. This type of signalling is typically used to effect remote control of metering information or control of domestic apparatus by way of the telemetry interface unit 8 without disturbing other apparatus connected to the telephone line.

Pre-ringing signalling may also be used. One service provided by the proprietor of the present application using pre-ringing signalling is a "caller display" service. In this service, prior to forwarding ringing current to the NTE 6, the network 1 forwards a DC line reversal and alerting tones followed by frequency-shift-keyed (FSK) signals indicating the source of the current call. A customer having a caller display unit 15 can be aware of who is calling prior to answering the call.

To alert the caller display unit 15 that signalling is about to be forwarded, a line reversal is effected by the network 1 to the NTE 6. On detection of the line reversal the caller display 15 monitors the line for up to five seconds for transmitted alert tones followed by FSK signals.

Should a customer complain that the caller display 15 is not accurate (or is not working) and request a line test, since the exact timing of the arrival of FSK signalling cannot be known, some difficulty in monitoring the functionality remotely occurs.

Therefore an identical unit to the caller display 15, caller display 16 is connected to the "NTE" 14 of the monitor unit 12.

Using another telephone 17 the operator sets up a test network call through the network 1 to the customer line circuit 4. A test network control function 9 causes the customer line circuit split to be effected at 20 and a call back through the network to the NTE 11 and thus to the monitor unit 12. The monitor unit 12 is used to hold the dial back connection to customer line circuit 4 while the first call is cleared. Accordingly, tone alert, FSK, ringing or speech signals received at the line circuit 4 may be monitored by way of the parallel connection.

For the avoidance of doubt it is here noted that the test network control function may be embedded in a test network of the exchange switching system or may be in proprietary line testing equipment of the kind controlled by a network wide distributed computing arrangement.

Thus, if the operator now establishes a second call through the network 1, normal signalling conditions apply and FSK signals will be transmitted via the line circuit 4 to the NTE 6 and will also be received at the monitoring unit 12. However, immediately prior to transmitting the final digit of the customer's telephone number, the operator uses a key to cause the monitoring unit 12 to effect a line reversal to the "NTE" thus simulating the conditions normally expected by caller displays 15, 16 prior to receipt of signalling. Accordingly when tone alert and FSK signals are transmitted to the customer's caller display 15, the caller display 16, having been correspondingly primed, will also respond to the signals in the same manner. This enables signals at the edge of the network to be tested for accuracy without needing attendance at the customer premises 3.

Note that not only the transmission accuracy of the network signalling is established by using the test system in this manner but also the content of the transmission. This enables the detection of data errors further back in the computing elements of the managed service infrastructure. This will also identify faulty line cards for example in a communications circuit.

Now, while the invention has been described with reference to the proprietor's caller display service, it will be appreciated the system is equally suited to testing signalling to be forwarded to any kind of apparatus connectable to standard terminations. For example, signalling for a telemetry interface unit 8 may be tested by connecting a corresponding unit at the customer service centre. Thus by allowing simulation at "NTE" 14 of pre-signalling (whether for pre-ringing or no-ringing signalling) conditions at the network edge, signalling accuracy by the network 1 can be remotely monitored.

What is claimed is:

1. Testing apparatus for connection to a monitoring point in a telecommunications network of the kind including means to establish a test connection through the network from network termination points to remote monitoring positions, the apparatus comprising:

means to cause the establishment of first and second calls through the network to network termination points by way of separate transmission paths, means to hold the transmission path established by a first call and to connect the transmission path through a connection port to signal monitoring apparatus during the second call characterised in that the monitoring apparatus further includes means to simulate normal on hook and pre-signalling conditions to the connection port whereby signals transmitted to the network termination point on establishment of the second call are received by connected monitoring apparatus.

2. A method of testing signalling in a telecommunications network comprising the steps of:

establishing a first call through a network to a remote point, causing a path to be established from the remote point to a monitoring location, releasing the first call, establishing a second call to the remote point, and simulating network conditions at the monitoring location to cause apparatus connected at that location to respond to network signals forwarded to the remote point.

3. A ringback testing apparatus for use in a telecommunications network, said apparatus comprising:

means for establishing two calls in the network to termination points using separate paths;

means for holding a first one of said calls while connecting a transmission path through a signal monitoring apparatus during the second one of said calls.

4. A ringback testing method for use in a telecommunications network, said method comprising:

establishing two calls in the network to termination points using separate paths;

holding a first one of said calls while connecting a transmission path through a signal monitoring apparatus during the second one of said calls.

5. A method for use of a monitoring point in a telecommunications network where a test connection is established through the network from network termination points to remote monitoring positions, the method comprising:

establishing first and second calls through the network to network termination points by way of separate transmission paths, holding the transmission path established by a first call and to connect the transmission path through a connection port to signal monitoring apparatus during the second call; and simulating normal on hook and pre-signalling conditions from the monitoring point to the connection port whereby signals transmitted to the network termination point on establishment of the second call are received by connected monitoring apparatus.

6. Apparatus for testing signalling in a telecommunications network, said apparatus comprising:

means for establishing a first call through a network to a remote point, means for causing a path to be established from the remote point to a monitoring location, releasing the first call, means for establishing a second call to the remote point, and means for simulating network conditions at the monitoring location to cause apparatus connected at that location to respond to network signals forwarded to the remote point.

* * * * *